United States Patent
Verma et al.

(10) Patent No.: US 11,997,337 B2
(45) Date of Patent: May 28, 2024

(54) METHOD AND SYSTEM FOR OPTIMIZING VIDEO CONTENT ACQUISITION AND DELIVERY DURING EVENTS

(71) Applicant: Wipro Limited, Bangalore (IN)

(72) Inventors: Manish Verma, Bangalore (IN); Varadaraj Govindsai Yatirajula, Bengaluru (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 17/809,958

(22) Filed: Jun. 30, 2022

(65) Prior Publication Data
US 2023/0370664 A1 Nov. 16, 2023

(30) Foreign Application Priority Data
May 12, 2022 (IN) .............................. 202241027428

(51) Int. Cl.
G06F 15/173 (2006.01)
H04N 21/258 (2011.01)
H04N 21/262 (2011.01)

(52) U.S. Cl.
CPC . *H04N 21/26216* (2013.01); *H04N 21/25883* (2013.01); *H04N 21/25891* (2013.01)

(58) Field of Classification Search
CPC ....... H04N 21/26216; H04N 21/25883; H04N 21/25891
(Continued)

(56) References Cited

U.S. PATENT DOCUMENTS 10,904,791 B2 1/2021 Naik et al.
2004/0045030 A1* 3/2004 Reynolds .............. H04L 65/612
725/110
(Continued)

FOREIGN PATENT DOCUMENTS

CN 112040265 A 12/2020

OTHER PUBLICATIONS

M. Keltsch, S. Prokesch, O. P. Gordo, J. Serrano, T. K. Phan and I. Fritzsch, "Remote Production and Mobile Contribution Over 5G Networks: Scenarios, Requirements and Approaches for Broadcast Quality Media Streaming," 2018 IEEE International Symposium on Broadband Multimedia Systems and Broadcasting (BMSB), 2018, pp. 1-7, doi: 10.1109/BMSB.2018.8436772.
(Continued)

*Primary Examiner* — Liang Che A Wang
(74) *Attorney, Agent, or Firm* — Finnegan, Henderson, Farabow, Garrett & Dunner, LLP (57) ABSTRACT

Disclosed herein is a method and system for optimizing video content acquisition and delivery during events. In an embodiment, an optimal video content for transmission is selected by analyzing plurality of videos of a live event captured by one or more video capturing units. Further, optimal video content is transmitted to a Media Processing Center (MPC) using a predefined unicast network. Furthermore, the optimal video content is processed into one or more predefined streaming formats corresponding to one or more streaming channels of a hybrid transmission service. Subsequently, an optimal delivery channel for each of a plurality of users is selected by analyzing a plurality of user parameters associated with the plurality of users and a plurality of sociological parameters associated with the live event. Finally, the optimal video content is transmitted to the
(Continued)

plurality of users through the optimal delivery channel selected for each of the plurality of users.

15 Claims, 5 Drawing Sheets

(58) Field of Classification Search
USPC .......................................... 709/226, 223, 224
See application file for complete search history.

(56) References Cited

U.S. PATENT DOCUMENTS

| | | | | |
|---|---|---|---|---|
| 2009/0138599 A1* | 5/2009 | Allin | .................. | H04L 12/5692 |
| | | | | 709/226 |
| 2013/0276035 A1* | 10/2013 | Walker | ............... | H04N 21/8456 |
| | | | | 725/62 |
| 2015/0100885 A1* | 4/2015 | Riley | .................. | G06F 3/04883 |
| | | | | 715/720 |
| 2015/0237537 A1* | 8/2015 | Stimpson | .......... | H04W 36/0085 |
| | | | | 370/331 |
| 2021/0397846 A1* | 12/2021 | Chang | ...................... | G06N 7/01 |

OTHER PUBLICATIONS

Advantech, "Highest Density Cloud Media Processing for OTT Video Delivery", May 9, 2017, 6 pages.

* cited by examiner

METHOD AND SYSTEM FOR OPTIMIZING VIDEO CONTENT ACQUISITION AND DELIVERY DURING EVENTS

TECHNICAL FIELD

The present disclosure, in general, relates to multimedia streaming, and particularly to a method and system for optimizing video content acquisition and delivery during events using Artificial Intelligence (AI).

BACKGROUND

Generally, during live sports and public events, the wireless broadband network may get congested when serving Over-The-Top (OTT) content to a large number of subscribers. There is no guaranteed Quality of Service (QoS) and Quality of Experience (QoE) for video services based on the user subscription level and preferences.

Further, the current media delivery mechanisms do not guarantee QoS and QoE for delivering OTT content to subscribers when the network is congested or overloaded. The distribution of the videos to consumers is currently based on a best effort basis. Also, the current wireless broadband networks are not designed to serve multiple unicast streams beyond the capacity of the underlying network during the live events.

Further, in locations such as stadiums, users experience the video with use cases like Augmented Reality (AR), Virtual Reality (VR) and large displays, which require cameras with 4K resolution and 360-degree video capture. Current private connectivity solutions in the stadiums fail to provide sufficient bandwidth to transmit the high-bandwidth video data due to limitations of the technology. These multiple camera feeds across event locations will congest the uplink to a media processing center. Additionally, at events like racing or multi-sport events (for example Olympics), multiple wireless cameras are needed for coverage of the entire event. The video feed generated from these cameras will further congest the uplink wireless channels.

Therefore, it would be desirable to have a streaming mechanism that optimizes streaming and enhances QoS and QoE to the users.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of optimizing video content delivery during live events. The method comprises creating, by a content delivery system, an optimal video content for transmission by analyzing a plurality of videos of a live event captured by one or more video capturing units. The plurality of videos is analyzed using a first pretrained Artificial Intelligence (AI) model. Further, the method comprises transmitting the optimal video content to a Media Processing Center (MPC) using a predefined unicast network. The MPC is associated with the content delivery system. Thereafter, the method comprises processing the optimal video content into one or more predefined streaming formats corresponding to one or more streaming channels of a hybrid transmission service. The one or more streaming channels comprises at least one of an Over-The-Top (OTT) channel and a broadcast channel. Furthermore, the method comprises selecting an optimal delivery channel for each of a plurality of users by analyzing a plurality of user parameters associated with the plurality of users and a plurality of sociological parameters associated with the plurality of users. The plurality of the user parameters and the plurality of sociological parameters are analyzed using a second pretrained AI model. Finally, the method comprises transmitting the optimal video content to the plurality of users through the optimal delivery channel selected for each of the plurality of users.

Further, the present disclosure relates to a content delivery system for optimizing video content delivery during live events. The content delivery system comprises a processor and a memory. The memory is communicatively coupled to the processor and stores processor-executable instructions, which on execution, cause the processor to select an optimal video content for transmission by analyzing a plurality of videos of a live event captured by one or more video capturing units. The analyzing of the plurality of videos is performed using a first pretrained Artificial Intelligence (AI) model. Further, the instructions cause the processor to transmit the optimal video content to a Media Processing Center (MPC) using a predefined unicast network. The MPC is associated with the content delivery system. Thereafter, the instructions cause the processor to process the optimal video content into one or more predefined streaming formats corresponding to one or more streaming channels of a hybrid transmission service. The one or more streaming channels comprises at least one of an Over-The-Top (OTT) channel and a broadcast channel. Furthermore, the instructions cause the processor to select an optimal delivery channel for each of a plurality of users by analyzing the plurality of user parameters associated with a plurality of users and a plurality of sociological parameters associated with the plurality of users. The analyzing is performed using a second pretrained AI model. Finally, the instructions cause the processor to transmit the optimal video content to the plurality of users through the optimal delivery channel selected for each of the plurality of users.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In an embodiment, the present disclosure proposes a method that optimizes video content delivery during live events. In an embodiment, the present disclosure selects an optimal video content for transmission by analyzing a plurality of videos of a live event captured by one or more video capturing units. For example, the one or more video capturing units may be a Digital Single-Lens Reflex (DSLR) camera, mirrorless video camera, sports and action video camera, professional grade camera etc. The plurality of videos is analyzed using a first pretrained Artificial Intelligence (AI) model. The present disclosure transmits the optimal video content to a Media Processing Center (MPC) using a predefined unicast network. The MPC is associated with the content delivery system. As an example, the predefined unicast network may be a 5G unicast network. Further, the content delivery system processes the optimal video content into one or more predefined streaming formats corresponding to one or more streaming channels of a hybrid transmission service. The one or more streaming channels may comprise at least one of an Over-The-Top (OTT) channel and a broadcast channel. For example, the OTT channel may be a $3^{rd}$ party OTT channel and/or a private application designed for streaming. The broadcast channel may be a predefined frequency at which the live event is telecasted at a location of the live event.

Furthermore, according to the present disclosure, an optimal delivery channel is selected for each of a plurality of users by analyzing a plurality of user parameters associated with the plurality of users and a plurality of sociological parameters associated with the plurality of users. The plurality of user parameters is analyzed using a second pretrained AI model. Finally, the optimal video content to the plurality of users is transmitted through the optimal delivery channel selected for each of the plurality of users.

In an embodiment, the proposed method aims for maintaining the Quality of Service (QoS) and Quality of Experience (QoE) of streaming media for the end users by offloading the content delivery from purely broadband channel to a hybrid broadband and/or broadcast delivery model. Also, the proposed invention helps in optimizing network switching from broadband to broadcast network and/or broadcast network to broadband based on the QoS and QoE of the end users.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
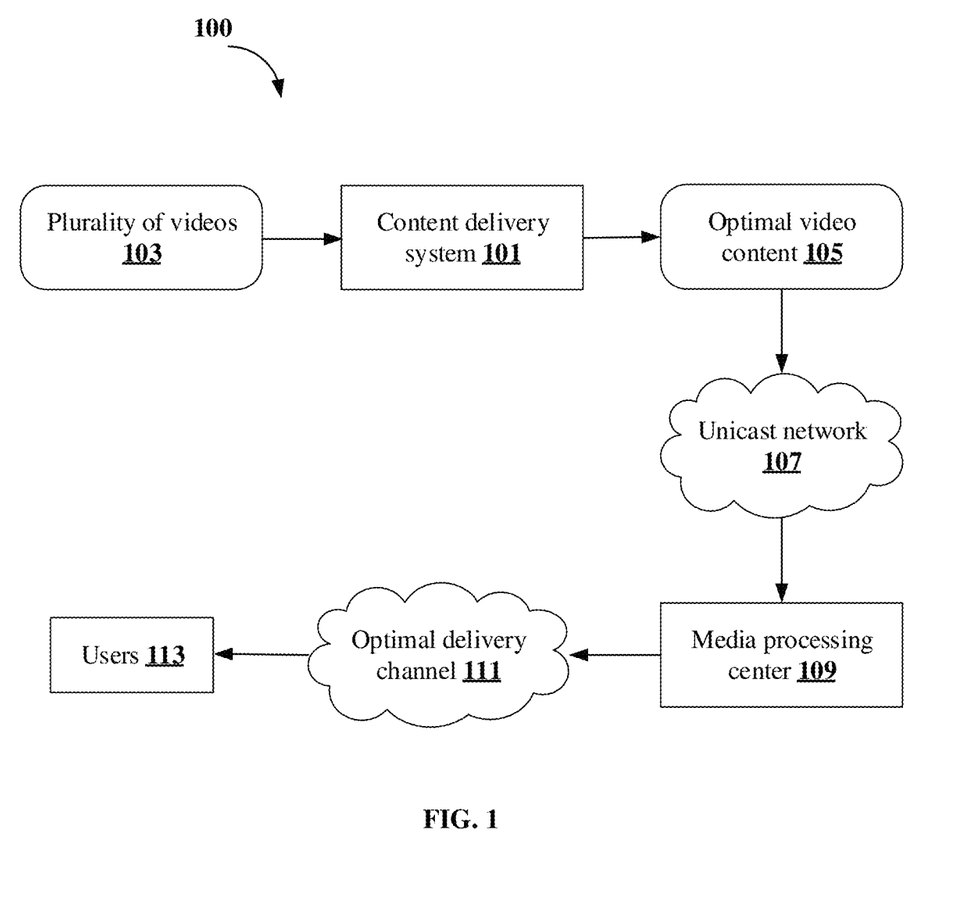
FIG. 1 shows an overview of functioning of a content delivery system in accordance with some embodiments of the present disclosure.

FIG. 1 shows an overview of functioning of a content delivery system, in accordance with some embodiments of the present disclosure.

In an embodiment, the content delivery system 101 may be a computing system including, without limiting to, a desktop computer, a laptop, a smartphone, and the like. The content delivery system 101 may be configured and used for optimizing video content delivery during live events. In an embodiment, during a live event, a plurality of videos 103 may be captured by one or more video capturing units. For example, the one or more video capturing units may be a Digital Single-Lens Reflex (DSLR) camera, mirrorless video camera, sports and action video camera, professional grade camera etc. The plurality of videos 103 may comprise a plurality of video frames covering same or different views of the live event. For example, the live event may be a sports event, an entertainment concert, an official event, and the like. In one embodiment, the plurality of videos 103 may also comprise pre-recorded videos stored in a server. For example, the plurality of pre-recorded videos may comprise a movie, a pre-recorded concert, a sports event, and the like.

In an embodiment, after receiving the plurality of videos 103 from the one or more video capturing units, the content delivery system 101, selects an optimal video content 105 for transmission by analyzing the plurality of videos 103. In an embodiment, the content delivery system 101 may use a first pretrained Artificial Intelligence (AI) model to analyze the plurality of videos 103 based on one or more parameters to select the optimal video content 105. As an example, the one or more parameters may comprise, without limiting to, at least one of a video frame similarity function, a video bitrate, a video frame rate, a video resolution, a container format, and a bandwidth of a network designated for the transmission. The video similarity function may include checking the plurality of videos 103 received from the one or more video capturing units to find a similarity among the plurality of videos 103. The video bitrate may comprise number of bits processed in a given unit of time. The video frame rate is the frequency at which consecutive images are captured or displayed. The video resolution is a number of distinct pixels in each dimension that can be displayed. The container format is a file format that allows multiple data streams to be embedded into a single file, along with a metadata for identifying and further detailing of the video streams. The bandwidth is a volume of information per unit of time that a transmission medium, like an internet connection, can handle.

In an embodiment, after selecting the optimal video content 105, the content delivery system 101 transmits the optimal video content 105 to a Media Processing Center 109 (MPC) for further processing using a predefined unicast network 107. As an example, the predefined unicast network 107 may be a 5G unicast network. The MPC 109 is associated with the content delivery system 101. For example, the MPC 109 may be a computing system including, without limiting to, a desktop computer, a laptop, a smartphone, and the like. In an embodiment, the MPC 109 is remotely connected to the content delivery system 101. Alternatively, the MPC 109 may be installed in the same location as that of the content delivery system 101 and connected to the content delivery system using a suitable wired/wireless communication channel In an embodiment, the optimal video content 105 may be a combined and optimized version of the plurality of videos 103 that is generated by selecting non-redundant and high-quality portions of the plurality of videos 103. The size of the optimal video content 105 may be lesser than an overall size of the plurality of videos 103, while the streaming quality of the optimal video content 105 is same as or comparable to the original streaming quality of the plurality of videos 103. Thus, by selecting and transmitting the optimal video content 105 to the MPC 109, the content delivery system 101 reduces the bandwidth requirement for live streaming by a significant amount.

In an embodiment, upon receiving the optimal video content 105, the content delivery system 101 processes the optimal video content 105 into one or more predefined streaming formats corresponding to one or more streaming channels of a hybrid transmission service. For example, the one or more streaming formats may be an Ultra High Definition (UHD) format, a Full High-Definition (FHD) format, a High-Definition (HD) format etc. The one or more streaming channels may comprise at least one of an Over-The-Top (OTT) channel and a broadcast channel. For example, the OTT channel may be a $3^{rd}$ party OTT channel and/or a private application designed for streaming. The broadcast channel may be a predefined frequency at which the live event is telecasted at a location of the live event.

In an embodiment, after processing, the content delivery system 101 selects an optimal delivery channel 111 for each of a plurality of users 113 by analyzing a plurality of user parameters associated with the plurality of users 113 and a plurality of sociological parameters associated with the plurality of users 113. In an embodiment, the content delivery system 101 may use a second AI model to analyze the plurality of user parameters and the plurality of sociological parameters. As an example, the plurality of user parameters may comprise, without limiting to, at least one of a user behavior data, personal profile of a user, a subscription tier, a media consumption pattern of the user, a broadband network provider of the user, and details of a user device associated with the user. In an embodiment, the user behavior data may include data related to behavior of user on an application like number of clicks, number of shares etc. The personal profile of the user may include age, gender and geographical location of the user. The subscription tier may indicate a viewing quality option that the user has subscribed to. As an example, a user may have subscribed to a premium subscription on the OTT channel which allows the user to watch the event in Full High-Definition (FHD) quality. The consumption pattern of the user may indicate the time of day and number of hours that the user may view the event. The broadband network provider of the user may be the network used by the user, the network may be a 5G network or Long-Term Evolution (LTE) network and like. The details of the user device may include details like whether the user device supports Full High Definition (FHD) streaming, screen resolution, battery related information and the like.

In an embodiment, the plurality of sociological parameters may comprise without limiting to, at least one of browsing history of the user, social media profile of the user, social media trends, content profiling, content subjects, and content metadata for third-party services. The browsing history of the user may include browsing information and key topics searched by the user related to the live event. The social media profile of the user may give an overview of the user's personal interests and likings. The social media trends may indicate popularity and trends related to the live event. The content profiling may be genre, parental ratings, critic ratings The content subjects may be actors, cast, directors, producers The content metadata for third-party services may include information related to scene description, event description, brand identification, content subject description and metadata tags.

In an embodiment, after selecting the optimal delivery channel 111, the content delivery system 101 may transmit the optimal video content 105 to the plurality of users 113 through the optimal delivery channel 111 selected for each of the plurality of users 113. Further, the content delivery system 101 may determine a network congestion in the optimal delivery channel 111 based on Key Performance Indicators (KPIs) corresponding to the optimal delivery channel 111. For example, the KPIs may include, without limiting to, latency, jitter, Bit Rate Error (BER), macro block errors, video start failures, connection failures, video buffer time and Mean Opinion Score (MOS) score etc. Further, the content delivery system 101 may determine number of the plurality of users 113 viewing the optimal video content 105 over the OTT channel and the broadcast channel. Furthermore, the content delivery system 101 may determine a streaming experience of the plurality of users 113 based on a streaming quality report collected from each of the plurality of users 113. Finally, the content delivery system 101 may switch, in real-time, the optimal delivery channel 111 between the OTT channel and the broadcast channel according to the network congestion, the number of the plurality of users 113 on the OTT channel and the broadcast channel, and the streaming experience of the plurality of users 113. In an embodiment, the content delivery system 101 dynamically switches between the OTT channel and the broadcast channel based on the above parameters.

In an embodiment, when the current optimal delivery channel 111 on a user device is the broadcast channel and the user has a good network connection, the content delivery system 101 may dynamically switch to the OTT channel In another embodiment, when the current optimal delivery channel 111 on the user device is the OTT channel and the user has a bad network connection, the content delivery system 101 may dynamically switch to the broadcast channel to reduce the network congestion in the OTT channel. In an embodiment, the other conditions like the cost of delivery channel and/or number of subscribers watching in real time may be considered for dynamically switching the optimal delivery channel 111 from the OTT channel to the broadcast channel. The dynamic optimal delivery switching provides a guaranteed Quality of Service (QoS) and Quality of Experience (QoE) to the plurality of users 113. In an embodiment, the plurality of users 113 may also get a notification on the user device to manually switch between the OTT channel and the broadcast channel. For example, consider a scenario in which the user has subscribed to a premium subscription that provides FHD videos to the user. If the user is not receiving the video in the FHD quality, then the content delivery system 101 may dynamically switch the optimal delivery channel 111 for the user to provide the guaranteed QoS and QoE to the user.

As illustrated in the above paragraphs, the proposed content delivery system 101 optimizes the streaming of videos at two levels. The first level of optimization is implemented at the source itself, i.e., by selecting and transmitting only the non-redundant and high-quality portions of the plurality of videos 103 to the MPC 109. Further, the second level of optimization is implemented by optimally switching the streaming channels selected for streaming the video content to the users.

Figure 2:
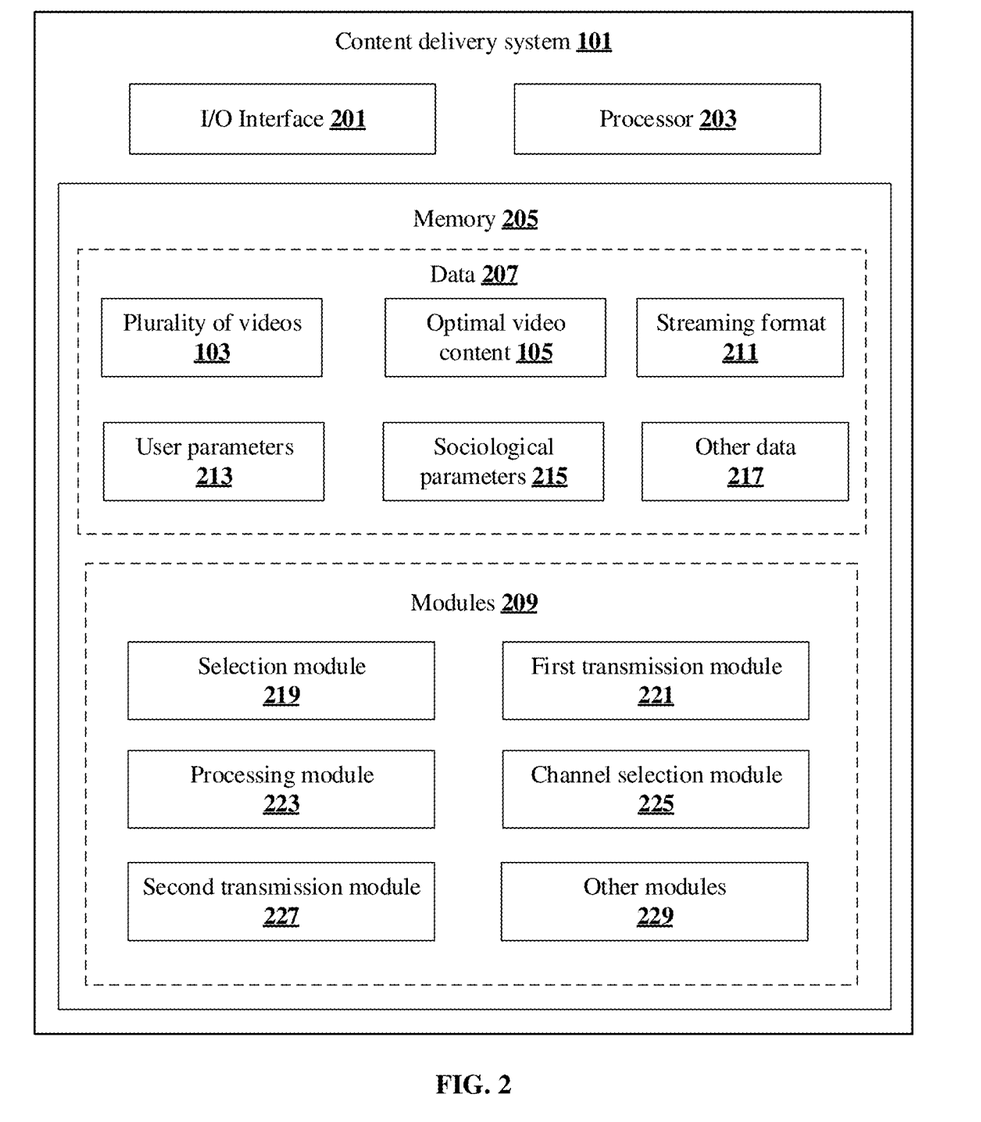
FIG. 2 shows a detailed block diagram of the content delivery system in accordance with some embodiments of the present disclosure.

FIG. 2 shows a detailed block diagram of a content delivery system 101 in accordance with some embodiments of the present disclosure.

In an embodiment, the content delivery system 101 may include an I/O interface 201, a processor 203 and a memory 205. The processor 203 may be configured to perform one or more functions of the content delivery system 101 for optimizing video content delivery during live events, using the data 207 and the one or more modules 209 in stored in the memory 205 of the content delivery system 101.

In an embodiment, the data 207 stored in the memory 205 may include, without limitation, a plurality of live videos 103, an optimal video content 105, a streaming format 211, a plurality of user parameters 213, a plurality of sociological parameters 215 and other data 217. In some implementations, the data 207 may be stored within the memory 205 in the form of various data structures. Additionally, the data 207 may be organized using data models, such as relational or hierarchical data models. The other data 217 may include various temporary data and files generated by the one or more modules 209.

In an embodiment, the plurality of videos 103 of an event are the videos captured by one or more video capturing units and/or the pre-recorded videos that are stored in a storage unit associated with the content delivery system 101. In an embodiment, the one or more video capturing units may be placed at different locations and/or at a same location during the live event. In an embodiment, the plurality of videos 103 may comprise a plurality of video frames covering same and/or different views of the live event.

In an embodiment, the optimal video content 105 is a video content generated after analyzing the plurality of videos 103 captured by the one or more video capturing units. In an embodiment, the optimal video content 105 is selected by analyzing one or more parameters using a first pretrained Artificial Intelligence (AI) model, for example a Deep Neural Network (DNN). In an embodiment, the one or more parameters may comprise, without limiting to, at least one of a video frame similarity function, a video bitrate, a video frame rate, a video resolution, a container format, and bandwidth of a network designated for the transmission and the like.

In an embodiment, the streaming format 211 is a format in which the optimal video content 105 must be streamed to the plurality of users 113. As an example, the streaming format 211 may be a Ultra High Definition (UHD), Full High-Definition (FHD) format, High-Definition (HD) format and the like.

In an embodiment, the plurality of user parameters 213 is used for selecting an optimal delivery channel for each of a plurality of users 113. In an embodiment, the plurality of user parameters 213 may be associated with the plurality of users 113. In an embodiment, the optimal delivery channel 111 is selected by analyzing the plurality of user parameters 213 using the second pretrained AI model, for example using logistic regression or a decision tree. In an embodiment, the plurality of user parameters 213 may comprise, without limiting to, at least one of the user behavior data, personal profile of the user, subscription tier, consumption pattern of the user, broadband network provider of the user, and details of a user device associated with the user etc.

In an embodiment, the plurality of sociological parameters 215 is used for selecting an optimal delivery channel 111 for each of a plurality of users 113. In an embodiment, the plurality of sociological parameters 215 may be associated with the plurality of users 113. In an embodiment, the optimal delivery channel 111 is selected by analyzing the plurality of sociological parameters 215 using the second pretrained AI model. In an embodiment, the plurality of sociological parameters 215 may comprise at least one of browsing history of a user, social media profile of the user, social media trends, content profiling, content subjects, and content metadata for third-party services etc.

In an embodiment, the data 207 may be processed by the one or more modules 209 of the content delivery system 101. In some implementations, the one or more modules 209 may be communicatively coupled to the processor 203 for performing one or more functions of the content delivery system 101. In an implementation, the one or more modules 209 may include, without limiting to, a selection module 219, a first transmission module 221, a processing module 223, a channel selection module 225, a second transmission module 227 and other modules 229.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 229 may be used to perform various miscellaneous functionalities of the content delivery system 101. It will be appreciated that such one or more modules 209 may be represented as a single module or a combination of different modules.

In an embodiment, the selection module 219 may be configured for selecting, an optimal video content 105 for transmission. The selection module 219 analyzes a plurality of videos 103 of a live event captured by one or more video capturing units. In an embodiment, the optimal video content 105 for transmission may have a best coverage of the live event. The data selection module 219 selects the optimal video content 105 by analyzing one or more parameters using the first pretrained Artificial Intelligence (AI) model.

In an embodiment, the first transmission module 221 may be configured for transmitting the optimal video content 105 to a Media processing center 109 (MPC) using a predefined unicast or multicast network 107. As an example, the predefined unicast network 107 may be a 5G network, a Wi-Fi network or LTE network.

In an embodiment, the processing module 223 may be configured for processing the optimal video content 105 into one or more predefined streaming formats 211 corresponding to one or more streaming channels of a hybrid transmission service. The one or more streaming channels may comprise at least one of an Over-The-Top (OTT) channel and a broadcast channel. The video content streamed through the OTT channel may be viewed using an application installed on a user's smartphone, tablet or any computing device. The broadcast channel may be a predefined frequency at which the live event is telecasted at a location of the live event.

The channel selection module 225 then selects an optimal delivery channel 111 for each of a plurality of users 113 by analyzing a plurality of user parameters 213 associated with the plurality of users 113 and a plurality of sociological parameters 215 associated with the plurality of users 113. The channel selection module 225 analyzes the plurality of the user parameters 213 using a second pretrained AI model. The channel selection module 225 uses the plurality of user parameters 213 and the plurality of sociological parameters 215 to select the optimal delivery channel 111. The optimal delivery channel 111 may be at least one of an Over-The-Top (OTT) channel and a broadcast channel.

In an embodiment, the second transmission module 227 is configured to transmit the optimal video content 105 to the plurality of users 113 through the optimal delivery channel 111 selected for each of the plurality of users 113. The second transmission module 227 determines a network congestion in the optimal delivery channel 111 based on Key Performance Indicators (KPIs) corresponding to the optimal delivery channel 111. The second transmission module 227 determines number of the plurality of users 113 viewing the optimal video content 105 over the OTT channel and the broadcast channel. Further, the second transmission module 227 determines in real-time, a streaming experience of the plurality of users 113 based on a streaming quality report collected from each of the plurality of users 113. Finally, the second transmission module 227 signals one or more of the plurality of users 113 to switch the optimal delivery channel 111 between the OTT channel and the broadcast channel according to the network congestion, the number of the plurality of users 113 on the OTT channel and the broadcast channel, and the streaming experience of the plurality of users 113.

Figure 3:
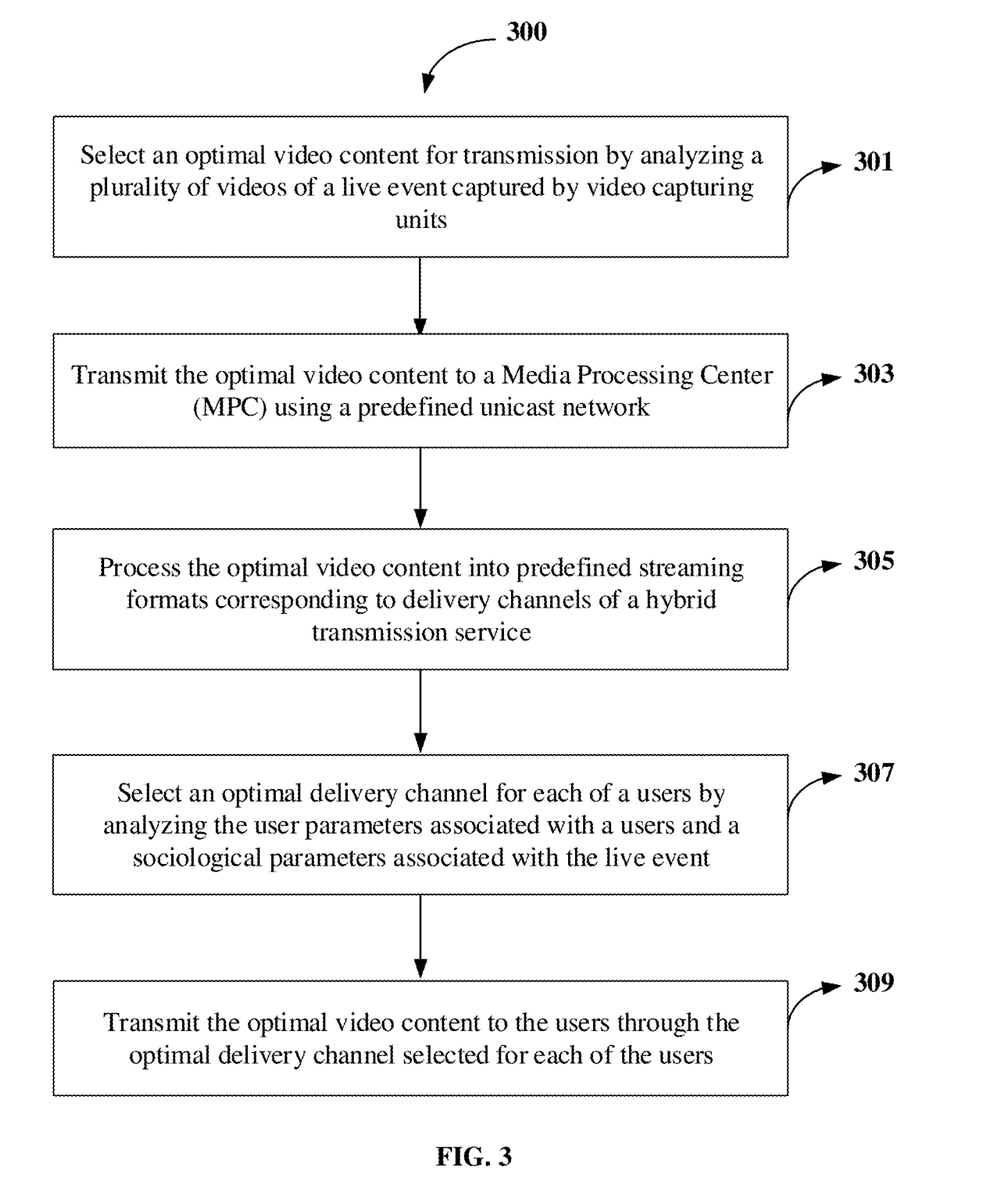
FIG. 3 shows a flowchart illustrating a method of optimizing video content delivery during live events, in accordance with some embodiments of the present disclosure.

FIG. 3 shows a flowchart illustrating a method of optimizing video content delivery during live events, in accordance with some embodiments of the present disclosure.

As illustrated in FIG. 3, the method 300 may include one or more blocks illustrating a method of optimizing video content delivery during live events using a content delivery system 101 illustrated in FIG. 2. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method 300 includes selecting, by the content delivery system 101, an optimal video content 105 for transmission by analyzing a plurality of videos 103 of a live event captured by one or more video capturing units. In an embodiment, the plurality of videos 103 may comprise a plurality of video frames covering same or different views of the live event. In an embodiment, the optimal video content 105 is selected by analyzing one or more parameters using the first pretrained AI model. The one or more parameters may comprise at least one and/or combination of a video frame similarity function, a video bitrate, a video frame rate, a video resolution, a container format, and bandwidth of a network designated for the transmission.

At block 303, the method 300 includes transmitting, by the content delivery system 101 the optimal video content 105 to a Media processing center 109 (MPC) using a predefined unicast network 107. The MPC 109 is associated with the content delivery system 101. As an example, the predefined unicast network 107 may be a 5G unicast network.

At block 305, the method 300 includes processing, by the content delivery system 101, the optimal video content 105 into one or more predefined streaming formats 211 corresponding to one or more streaming channels of a hybrid transmission service. In an embodiment, the one or more streaming channels comprises at least one of an Over-The-Top (OTT) channel and a broadcast channel. For example, the OTT channel may be a $3^{rd}$ party OTT channel and/or a private application designed for streaming. The broadcast channel may be a predefined frequency at which the live event is telecasted at a location of the live event.

At block 307, the method 300 includes selecting, by the content delivery system 101, an optimal delivery channel 111 for each of a plurality of users 113 by analyzing a plurality of user parameters 213 associated with the plurality of users 113 and a plurality of sociological parameters 215 associated with the plurality of users 113. In an embodiment, the analyzing of the plurality of the user parameters 213 and the plurality of sociological parameters 215 is performed using a second pretrained AI model. The plurality of user parameters 213 may comprise at least one of and/or combination of a user behavior data, personal profile of a user, subscription tier, consumption pattern of the user, broadband network provider of the user, and details of a user device associated with the user. The plurality of sociological parameters 215 may comprise at least one and/or combination of browsing history of a user, social media profile of the user, social media trends, content profiling, content subjects, and content metadata for third-party services etc.

At block 309, the method 300 includes transmitting, by the content delivery system 101, the optimal video content 105 to the plurality of users 113 through the optimal delivery channel 111 selected for each of the plurality of users 113. In an embodiment, the content delivery system 101 determines a network congestion in the optimal delivery channel 111 based on Key Performance Indicators (KPIs) corresponding to the optimal delivery channel 111. Further, the content delivery system 101 determines number of the plurality of users 113 viewing the optimal video content 105 over the OTT channel and the broadcast channel. Furthermore, the content delivery system 101 determines a streaming experience of the plurality of users 113 based on a streaming quality report collected from each of the plurality of users 113. Finally, the content delivery system 101 switches in real-time, the optimal delivery channel 111 between the OTT channel and the broadcast channel according to the network congestion, the number of the plurality of users 113 on the OTT channel and the broadcast channel, and the streaming experience of the plurality of users 113.

Figure 4:
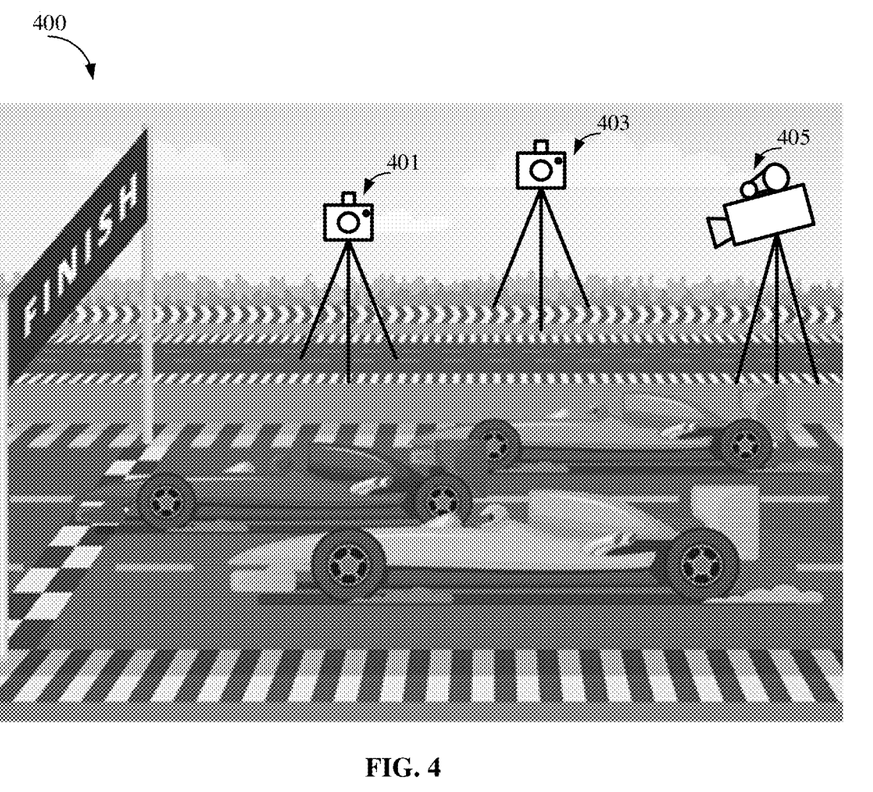
FIG. 4 shows an exemplary scenario of a live event with one or more video capturing units, in accordance with some embodiments of the present disclosure.

FIG. 4 shows an exemplary scenario of a live event with one or more video capturing units, in accordance with some embodiments of the present disclosure.

FIG. 4 illustrates a scenario of a live car racing event. Suppose a plurality of video capturing devices 401, 403 and 405 are deployed at predefined locations on the sides of the racing track. Further, consider a scenario in which a first video capturing device 401 and a second video capturing device 403 are capturing the same view of the car racing event, but a third video capturing device 405 is capturing a different view of the car racing event. In this scenario, the content delivery system 101 selects an optimal video content 105 by analyzing one or more parameters of the videos from the first video capturing device 401, the second video capturing device 403 and the third video capturing device 405. In an embodiment, since the first video capturing device 401 and the second video capturing device 403 are capturing the same view of the car racing event, the content delivery system 101 selects a video from any one of these two video capturing units, i.e., either 401 or 403. Additionally, the content delivery system 101 also selects the video from the third video capturing device 405 as it is covering the different view when compared to the view covered by 401 and 403. After the selection, the optimal video content 105 is transmitted to a Media Processing Center (MPC) 109 using a predefined unicast network 107 for further processing.

Computer System

Figure 5:
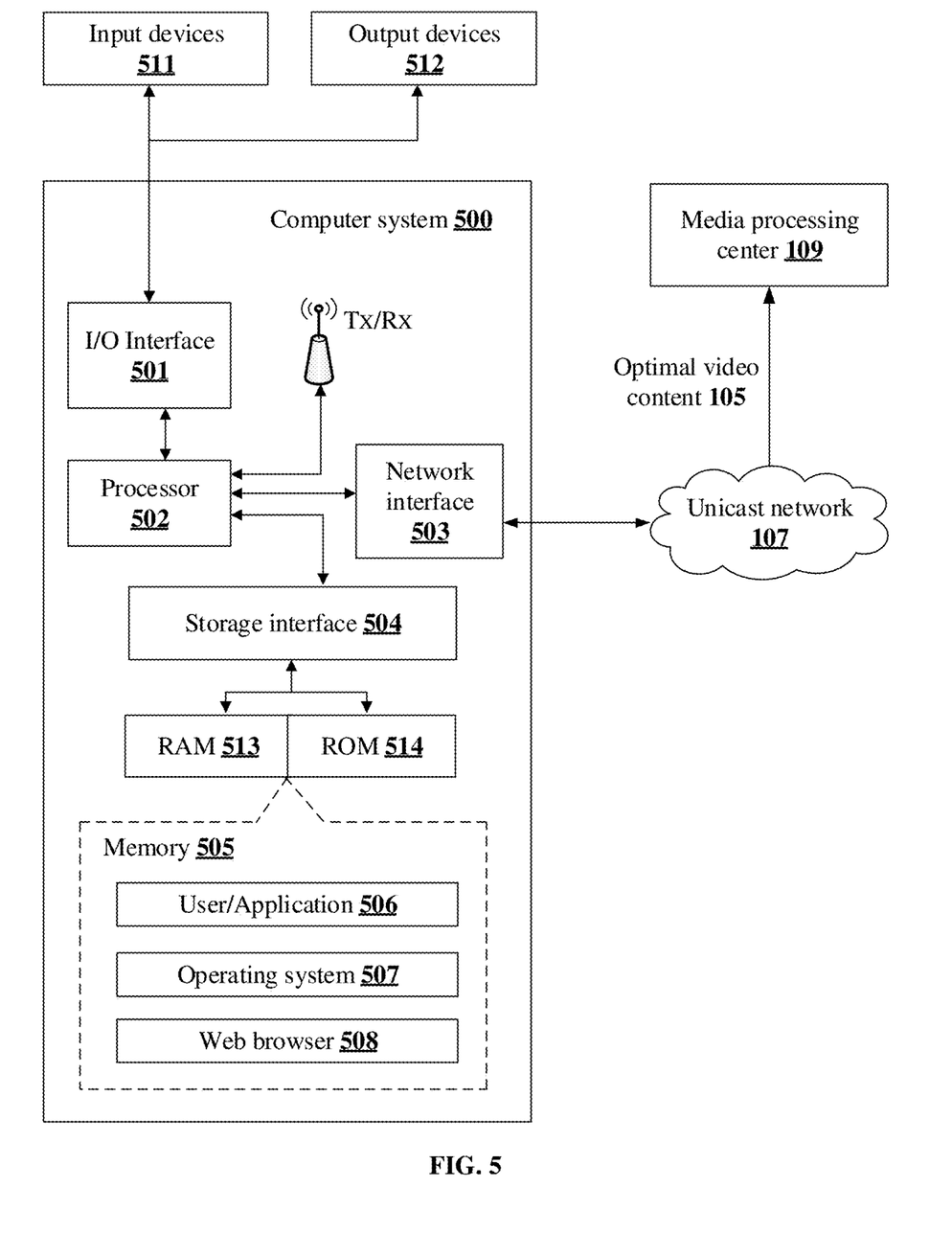
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the content delivery system 101 illustrated in FIG. 2, which may be used for optimizing video content delivery during live events. The computer system 500 may include a central processing unit ("CPU" or "processor" or "memory controller") 502. The processor 502 may comprise at least one data processor for executing program components for executing user- or system-generated business processes. The processor 502 may include specialized processing units such as integrated system (bus) controllers, memory controllers/memory management control units, floating point units, graphics processing units, digital signal processing units, etc.

The processor 502 may be disposed in communication with one or more Input/Output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a unicast network 107 via a network interface 503. The network interface 503 may communicate with the unicast network 107. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the unicast network 107, the computer system 500 may connect with a Media Processing Center (MPC) 109, which may be associated with the content delivery system 101.

In an implementation, the unicast network 107 may be a 5G unicast network used to send the optimal video content 105 to the MPC 109.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like.

Further, the computer system 400 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein In an embodiment, the present disclosure helps in providing sufficient bandwidth to transmit high-bandwidth video data for current private connectivity solutions in a live event. Consequently, the present disclosure helps in reducing the congestion during uplink transmission across event locations.

In an embodiment, the present disclosure helps in optimal content processing and compression of media data from the camera feed and sensors. Also, the present disclosure helps in compressing the video data generated by the wireless cameras and sensors adequately.

In an embodiment, the present disclosure helps in maintaining Quality of Service (QoS) and Quality of Experience (QoE) for delivering multimedia content to users. Also, the present disclosure provides feedback mechanism from User Equipment (UE) to network for monitoring the QoS in real time and dynamically allocate the network resources to maintain the QoS and QoE.

In an embodiment, the present disclosure helps in reducing significant delays in the pipeline and decreases the latency for ensuring the near real-time video delivery.

In light of the technical advancements provided by the disclosed method and the content delivery system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Content delivery system |
| 103 | Plurality of videos |
| 105 | Optimal video content |
| 107 | Unicast network |
| 109 | Media Processing Center (MPC) |
| 111 | Optimal delivery channel |
| 113 | Plurality of users |
| 201 | I/O Interface |
| 203 | Processor |
| 205 | Memory |
| 207 | Data |
| 209 | Modules |
| 211 | Streaming format |
| 213 | User parameters |
| 215 | Sociological parameters |
| 217 | Other data |

-continued

| Reference Number | Description |
| --- | --- |
| 219 | Selection module |
| 221 | First transmission module |
| 223 | Processing module |
| 225 | Channel selection module |
| 227 | Second transmission module |
| 229 | Other modules |
| 401 | First video capturing unit |
| 403 | Second video capturing unit |
| 405 | Third video capturing unit |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 511 | Input devices |
| 512 | Output devices |
| 513 | RAM |
| 514 | ROM |

What is claimed is:

1. A method of optimizing video content delivery during live events, the method comprising:
selecting, by a content delivery system, an optimal video content for transmission by analyzing a plurality of videos of a live event captured by one or more video capturing units, wherein the analyzing of the plurality of videos is performed using a first pretrained Artificial Intelligence (AI) model;
transmitting, by the content delivery system, the optimal video content to a Media Processing Center (MPC) using a predefined unicast network, wherein the MPC is associated with the content delivery system;
processing, by the content delivery system, the optimal video content into one or more predefined streaming formats corresponding to one or more streaming channels of a hybrid transmission service, wherein the one or more streaming channels comprises an Over-The-Top (OTT) channel and a broadcast channel;
selecting, by the content delivery system, an optimal delivery channel for each of a plurality of users by analyzing a plurality of user parameters associated with the plurality of users and a plurality of sociological parameters associated with the plurality of users, wherein the analyzing of the plurality of user parameters and the plurality of sociological parameters is performed using a second pretrained AI model; and
transmitting, by the content delivery system, the optimal video content to the plurality of users through the optimal delivery channel selected for each of the plurality of users, wherein transmitting the optimal video content comprises:
switching, in real-time, the optimal delivery channel between the OTT channel and the broadcast channel according to a network congestion, a number of the plurality of users on the OTT channel and the broadcast channel, and a streaming experience of the plurality of users.

2. The method as claimed in claim 1, wherein the plurality of videos comprises a plurality of video frames covering same or different views of the live event.

3. The method as claimed in claim 1, wherein the optimal video content is selected by analyzing one or more parameters using the first pretrained AI model, wherein the one or more parameters comprises at least one of a video frame similarity function, a video bitrate, a video frame rate, a video resolution, a container format, and bandwidth of a network designated for the transmission.

4. The method as claimed in claim 1, wherein the plurality of user parameters comprises at least one of a user behavior data, personal profile of a user, subscription tier, consumption pattern of the user, broadband network provider of the user, and details of a user device associated with the user.

5. The method as claimed in claim 1, wherein the plurality of sociological parameters comprises at least one of browsing history of a user, social media profile of the user, social media trends, content profiling, content subjects, and content metadata for third-party services.

6. The method as claimed in claim 1, wherein transmitting the optimal video content further comprises:
determining the network congestion in the optimal delivery channel based on Key Performance Indicators (KPIs) corresponding to the optimal delivery channel;
determining the number of the plurality of users viewing the optimal video content over the OTT channel and the broadcast channel; and
determining, in real-time, the streaming experience of the plurality of users based on a streaming quality report collected from each of the plurality of users.

7. The method as claimed in claim 1 further comprises:
customizing the optimal video content for each of the plurality of users based on the plurality of user parameters and the plurality of sociological parameters.

8. A content delivery system for optimizing video content delivery during live events, the content delivery system comprising:
a processor; and
a memory, communicatively coupled to the processor, wherein the memory stores processor-executable instructions, which, on execution, causes the processor to:
select an optimal video content for transmission by analyzing a plurality of videos of a live event captured by one or more video capturing units, wherein the analyzing of the plurality of videos is performed using a first pretrained Artificial Intelligence (AI) model;
transmit the optimal video content to a Media Processing Center (MPC) using a predefined unicast network, wherein the MPC is associated with the content delivery system;
process the optimal video content into one or more predefined streaming formats corresponding to one or more streaming channels of a hybrid transmission service, wherein the one or more streaming channels comprises an Over-The-Top (OTT) channel and a broadcast channel;
select an optimal delivery channel for each of a plurality of users by analyzing the plurality of user parameters associated with a plurality of users and a plurality of sociological parameters associated with the plurality of users, wherein the analyzing is performed using a second pretrained AI model; and
transmit the optimal video content to the plurality of users through the optimal delivery channel selected for each of the plurality of users, wherein transmitting the optimal video content comprises:
switching, in real-time, the optimal delivery channel between the OTT channel and the broadcast channel according to a network congestion, a number of the plurality of users on the OTT channel and the broadcast channel, and a streaming experience of the plurality of users.

9. The content delivery system as claimed in claim 8, wherein the plurality of videos comprises a plurality of video frames covering same or different views of the live event.

10. The content delivery system as claimed in claim 8, wherein the processor selects the optimal video content by analyzing one or more parameters using the first pretrained AI model, wherein the one or more parameters comprises at least one of a video frame similarity function, a video bitrate, a video frame rate, a video resolution, a container format, and bandwidth of a network designated for the transmission.

11. The content delivery system as claimed in claim 8, wherein the plurality of user parameters comprises at least one of a user behavior data, personal profile of a user, subscription tier, consumption pattern of the user, broadband network provider of the user, and details of a user device associated with the user.

12. The content delivery system as claimed in claim 8, wherein the plurality of sociological parameters comprises at least one of browsing history of a user, social media profile of the user, social media trends, content profiling, content subjects, and content metadata for third-party services.

13. The content delivery system as claimed in claim 8, wherein the processor transmits the optimal video content by:
   determining the network congestion in the optimal delivery channel based on Key Performance Indicators (KPIs) corresponding to the optimal delivery channel;
   determining the number of the plurality of users viewing the optimal video content over the OTT channel and the broadcast channel; and
   determining, in real-time, the streaming experience of the plurality of users based on a streaming quality report collected from each of the plurality of users.

14. The content delivery system as claimed in claim 8, wherein the processor is further configured to customize the optimal video content for each of the plurality of users based on the plurality of user parameters and the plurality of sociological parameters.

15. A non-transitory computer readable medium including instructions stored thereon that when processed by at least one processor, cause a content delivery system to perform operations comprising:
   selecting an optimal video content for transmission by analyzing a plurality of videos of a live event captured by one or more video capturing units, wherein the analyzing of the plurality of videos is performed using a first pretrained Artificial Intelligence (AI) model;
   transmitting the optimal video content to a Media Processing Center (MPC) using a predefined unicast network, wherein the MPC is associated with the content delivery system;
   processing the optimal video content into one or more predefined streaming formats corresponding to one or more streaming channels of a hybrid transmission service, wherein the one or more streaming channels comprises an Over-The-Top (OTT) channel and a broadcast channel;
   selecting an optimal delivery channel for each of a plurality of users by analyzing a plurality of user parameters associated with the plurality of users and a plurality of sociological parameters associated with the plurality of users, wherein the analyzing of the plurality of user parameters and the plurality of sociological parameters is performed using a second pretrained AI model; and
   transmitting the optimal video content to the plurality of users through the optimal delivery channel selected for each of the plurality of users, wherein transmitting the optimal video content comprises:
      switching, in real-time, the optimal delivery channel between the OTT channel and the broadcast channel according to a network congestion, a number of the plurality of users on the OTT channel and the broadcast channel, and a streaming experience of the plurality of users.

* * * * *